United States Patent [19]

Watanuki

[11] Patent Number: 4,806,904

[45] Date of Patent: Feb. 21, 1989

[54] HEAD-UP DISPLAY DEVICE

[75] Inventor: Hitoshi Watanuki, Kanagawa, Japan

[73] Assignee: Nissan Motor Co., Ltd., Yokohama, Japan

[21] Appl. No.: 145,321

[22] Filed: Jan. 19, 1988

[30] Foreign Application Priority Data

Feb. 23, 1987 [JP] Japan .............................. 62-26099[U]

[51] Int. Cl.$^4$ .......................... B60Q 1/00; G09G 3/02
[52] U.S. Cl. .................................. 340/103; 340/52 F;
340/97; 340/98; 340/705; 340/980
[58] Field of Search ................... 340/103, 97, 98, 705,
340/980, 52 F, 124, 145, 815.06–815.09

[56] References Cited

U.S. PATENT DOCUMENTS 4,635,033 1/1987 Inukai et al. ......................... 340/103
4,740,780 4/1988 Brown et al. ....................... 340/705
4,742,389 5/1988 Schiffman ........................... 340/705

Primary Examiner—Donnie L. Crosland
Attorney, Agent, or Firm—Foley & Lardner, Schwartz, Jeffery, Schwaab, Mack, Blumenthal & Evans

[57] ABSTRACT

A head-up display device is provided with a light-emitting display body provided in the instrument panel, a reflecting mirror which reflects the displayed light from the light-emitting display body onto a reflection section, a housing which encloses the light-emitting display body and the reflecting mirror, and a linkage member for connecting the housing to a steering member, so that the housing is caused to slide forwards and backwards of the vehicle following upward and downward motions of the steering member.

3 Claims, 1 Drawing Sheet

HEAD-UP DISPLAY DEVICE

BACKGROUND OF THE INVENTION

Field of the Invention

The present invention relates to a head-up display device for an automobile.

A conventional head-up display device for an automobile, for example, the display outlined in Japanese Utility Model Publication of Unexamined Application No. SHO-61-119833, comprises a light-emitting display body provided in the instrument panel and a reflecting mirror which reflects the light display of the light-emitting display body onto the front window panel.

However, with such conventional technology the position of the reflecting mirror is fixed. Therefore, the position on the front window panel of the displayed image is also fixed. A problem therefore results inasmuch as it is impossible to adjust the reflected display to a position desired by the driver.

SUMMARY OF THE INVENTION

An object of the present invention is to provide, with due consideration to the drawbacks of such conventional devices, a display device which can be reflected to a position desired by the driver.

In order to achieve this objective, a head-up display device is provided which comprises a light-emitting display body provided in the instrument panel, a reflecting mirror which reflects the displayed light from the light-emitting display body onto a reflection section, a housing which encloses the light-emitting display body and the reflecting mirror, and a linkage member for connecting the housing to a steering member, so that the housing is caused to slide forwards and backwards of the vehicle following upward and downward motions of the steering member.

BRIEF DESCRIPTION OF THE DRAWINGS

These and other objects, features, and advantages of the present invention will become more apparent from the following description of the preferred embodiment taken in conjunction with the accompanying drawing, in which.

DETAILED DESCRIPTION OF THE PREFERRED EMBODIMENTS

Figure 1:
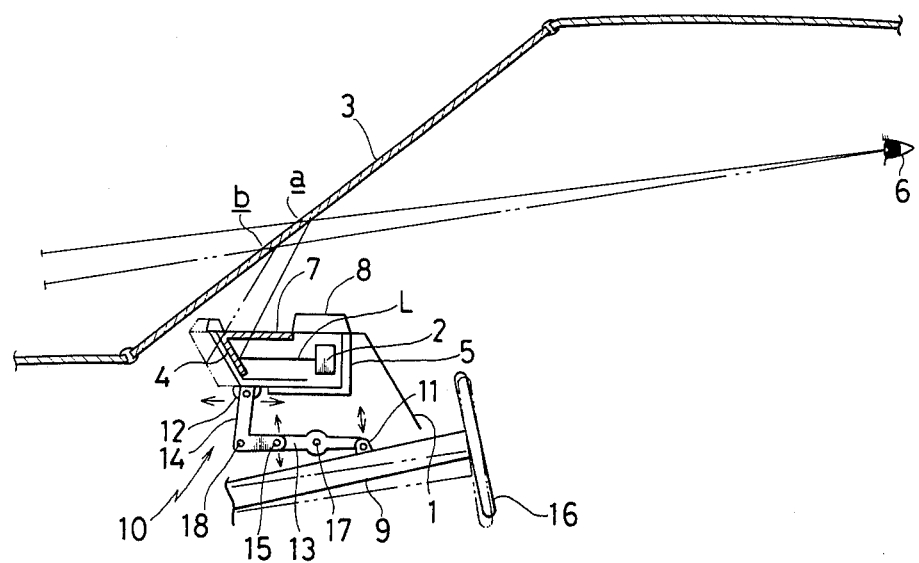
FIG. 1 is a partially cross sectional side elevational view of one embodiment of the present invention.

Now referring to FIG. 1, an embodiment of the present invention will be described. A head-up display device comprises a light-emitting display body 2 provided in an instrument panel 1; a reflecting mirror 4 which reflects the display light L from the light-emitting display body 2 onto a reflection section 3 on the front window panel; a housing 5 which encloses the light emitting display body 2 and the reflecting mirror 4; and a linkage member 10 which is provided to connect the housing 5 to a steering member 9, which is adapted to be moved up and down at a steering wheel around a gear box (omitted from the drawing) so that the housing 5 follows the upward and downward movements of the steering member 9 to slide forwards and backwards of the vehicle, specifically, so that it is possible for the housing 5 to move from the position indicated by the solid line to the position indicated by the dashed line in the drawing. The linkage member 10 comprises a first bracket 11 which upwardly protrudes from the steering member 9, a second bracket 12 which downwardly protrudes from the housing 5, a first link 13 which is supported by the first bracket 11 in a freely rotatable manner, a second link 14 which is supported by the second bracket 12 in a freely rotatable manner and bent in a L-shape for connection with the first link 13; and a linkage pin 15 which connects, in a freely rotatable manner, the links 13 and 14 at the free ends thereof. Although the second link 14 is bent into the L-shape in the case of this embodiment of the present invention, thr first link 13 can be bent instead of the second link 14.

The housing 5 comprises two separated sections, one for accommodating the light-emitting display body 2 and the other for the reflecting mirror 4 with the section for the light-emitting display body 2 being fixed and the position of the reflecting mirror 4 being movable. However, the housing can be made in a single body to accommodate both of the light-emitting display body 2 and the reflecting mirror 4.

In the drawing, the display reflected at the mirror 4 goes through a glass plate 7 provided on the instrument panel 1, and is reflected by the front window panel 3 and caught by the eye-point 6 of the driver.

Accordingly, when the steering member 9 is tilted, for example, downward, the first bracket 11 is moved in the same direction and the first link 13 rotates around a center shaft 17 in the clockwise direction in the drawing, the second link 14 rotates around a center shaft 18 in the counter clockwise direction in the drawing, and the housing 5 moves forward to the position indicated by the dashed line. For this reason, the position of the reflecting mirror 4 shifts forward, and the position at which the image is reflected onto the reflection section 3 shifts downward from location a to location b on the front window panel as indicated in the drawing. It will be noted that both the steering member 9 and the reflection position shift in the same direction.

Accordingly, by means of the present invention, if the steering member is moved downward or upward, the housing is moved forward or rearward, thus moving the image to a position desired by the driver.

As explained above, the present invention provides a head-up display device which comprises a light-emitting display body provided in an instrument panel; a reflecting mirror which reflects the display light from the light-emitting display body onto a reflection section; a housing which encloses the light-emitting display body and the reflecting mirror; and a linkage member which is provided to connect the housing to the steering member, so that the housing can slides forwards and and backwards of the vehicle following the upward and downward motions of a steering member. Accordingly, when the steering member is moved to the optimum position with respect to the driving position of the driver of the vehicle, it becomes possible to display figures and the like in the most suitable position for the driver.

What is claimed is:

1. A head-up display device for a vehicle comprising:
   a light-emitting display body provided in an instrument panel;
   a reflecting mirror which reflects the display light from the light-emitting display body onto a reflection section; a housing which encloses the light-emitting display body and the reflecting mirror; and a linkage member for connecting the housing to a steering member, so that the housing can slide forwards and backwards of the vehicle in correspondence with upward and downward motions of the steering member.

2. The head-up display device of claim 1, wherein the housing is devided into first and second sections, the first section for accommodating the reflecting mirror and the second section for accommodating the light-emitting display, and the first section adapted to slide forwards and backwards of the vehicle in correspondence with upward and downward motions of the steering member.

3. A head-up display device for a vehicle provided in an instrument panel between a front window panel and a steering member, the display comprising a housing provided in the instrument panel for accommodating a light-emitting display body and a reflecting mirror provided to reflect a display light from the light-emitting display body onto the front window panel, and a linkage member provided to connect the housing to the steering member, so as to transmit the upwards and downwards movements of the steering member to the housing to laterally move the reflecting mirror.

* * * * *